United States Patent
Bae (10) Patent No.: US 9,835,867 B2
(45) Date of Patent: Dec. 5, 2017

(54) HEAD-MOUNTED DISPLAY

(71) Applicant: YoungSik Bae, Seoul (KR)

(72) Inventor: YoungSik Bae, Seoul (KR)

( * ) Notice: Subject to any disclaimer, the term of this patent is extended or adjusted under 35 U.S.C. 154(b) by 0 days.

(21) Appl. No.: 14/889,373

(22) PCT Filed: May 7, 2014

(86) PCT No.: PCT/KR2014/003988
§ 371 (c)(1),
(2) Date: Nov. 5, 2015

(87) PCT Pub. No.: WO2014/182030
PCT Pub. Date: Nov. 13, 2014

(65) Prior Publication Data
US 2016/0116746 A1 Apr. 28, 2016

(30) Foreign Application Priority Data

May 7, 2013 (KR) .......................... 10-2013-0051454
Apr. 30, 2014 (KR) .......................... 10-2014-0052145

(51) Int. Cl.
*G09G 5/00* (2006.01)
*G02B 27/01* (2006.01)
*H04R 1/02* (2006.01)

(52) U.S. Cl.
CPC ..... *G02B 27/0176* (2013.01); *G02B 27/0172* (2013.01); *G02B 27/0179* (2013.01); *H04R 1/028* (2013.01); *G02B 2027/013* (2013.01); *G02B 2027/014* (2013.01); *G02B 2027/015* (2013.01); *G02B 2027/0138* (2013.01); *G02B 2027/0154* (2013.01); *H04R 2201/107* (2013.01); *H04R 2420/07* (2013.01); *H04R 2460/07* (2013.01); *H04R 2499/11* (2013.01)

(58) Field of Classification Search
CPC ....................................................... G09G 5/00
USPC ............................................................ 345/8
See application file for complete search history.

(56) References Cited

U.S. PATENT DOCUMENTS

| | | | |
|---|---|---|---|
| 9,316,834 B2* | 4/2016 | Makino | G02B 27/0172 |
| 2005/0231599 A1* | 10/2005 | Yamasaki | G02B 3/14 348/207.99 |
| 2006/0119539 A1* | 6/2006 | Kato | G02B 27/0176 345/8 |
| 2010/0157433 A1 | 6/2010 | Mukawa et al. | |

(Continued)

FOREIGN PATENT DOCUMENTS

| | | |
|---|---|---|
| JP | 2007-258913 A | 10/2007 |
| JP | 2010-226217 A | 10/2010 |
| JP | 2010226217 * | 10/2010 |

(Continued)

*Primary Examiner* — Kent Chang
*Assistant Examiner* — Scott Au
(74) *Attorney, Agent, or Firm* — STIP Law Group, LLC (57) ABSTRACT

The present invention relates to a head-mounted display including a pair of headphones having a built-in speaker for outputting sound, a first arm rotatably coupled to the pair of headphones to display an image, a second arm coupled to the pair of headphones so as to relatively rotate with the first arm to cover or uncover a front surface of the first arm, and a control unit controlling the image output to the first arm and the sound output to the headphones according to positions of the first arm and the second arm.

10 Claims, 7 Drawing Sheets

(56) References Cited

U.S. PATENT DOCUMENTS

2013/0021311 A1* 1/2013 Watanabe .......... G02B 27/0176
345/211
2014/0204117 A1* 7/2014 Kinnebrew ........... G06T 19/006
345/633

FOREIGN PATENT DOCUMENTS

KR   10-2011-0103726 A   9/2011
KR   10-2013-0034125 A   4/2013

* cited by examiner

HEAD-MOUNTED DISPLAY

TECHNICAL FIELD

The present invention relates to a head-mounted display, and more particularly, to a head-mounted display to which a smart glass function is added.

BACKGROUND ART

Recently, wearable computing products are introduced to more conveniently use portable computers, but these need shapes and elements for better stability and functionality.

Since existing smart-glasses, which are one of wearable computing products, are provided with only one transparent screen, it is inconvenient to use the same in a bright region, and these smart-glasses provide a fixed function which recognizes only the front view.

Also, as one of wearable computing products, a head-mounted display is an apparatus which generates an image using a display device such as a liquid crystal display device (LCD), magnifies the generated image into an enlarged scale to be viewed, and is used to view the image as mounted on the head of a human, and since the head-mounted display is designed mainly for use in a closed area only, the head-mounted display has a limitation that it may be inconvenient for mobile use and not be safely used in motion.

That is, the head-mounted display provides an excellent image, but is not suitable for normal wearing due to limitations of the structure, and a user is unable to move wearing the head-mounted display due to lack of transparency.

DISCLOSURE OF THE INVENTION

Technical Problem

The present invention is devised in consideration of the limitations described above, and an object of the present invention is to provide a head-mounted display which the function of a smart glass is added to, may be transformed to be used in various shapes, enhances portability and convenience of use, and may be safely used.

Technical Solution

To achieve the object, the present invention provide a head-mounted display including: a pair of headphones having a built-in speaker for outputting sound; a first arm rotatably coupled to the pair of headphones and displaying an image; a second arm coupled to the pair of headphones to be relatively rotatable with the first arm to cover or uncover a front surface of the first arm; and a control unit controlling the image output on the first arm and the sound output through the headphone according to positions of the first arm and the second arm.

In an embodiment, the first arm may be made of a transparent flexible display and the second arm may be made of an opaque material.

In an embodiment, each of the first arm and the second arm may reciprocally move among a first position located on a front side of the head of a wearer, a second position located on an upper side of the head of the wearer, and a third position located on a rear side of the head of the wearer.

In an embodiment, the above head-mounted display may further include a plurality of position detecting sensors sensing positions of the first arm and the second arm.

In an embodiment, a first rail groove and a second rail groove may be defined in the headphones apart from each other by a predetermined distance so that the first arm and the second arm respectively rotate along the rotation tracks of the first and the second rail grooves, and the plurality of position detecting sensors are disposed in the first rail groove and the second rail groove.

In an embodiment, the head-mounted display may further include: a data storage unit for storing an image data, a sound data, and an information data therein; a camera for shooting an image; a microphone for receiving a sound input; a display module for displaying an image on the first arm; a sound output module for outputting sound through the speaker; a mobile communication module provided with a smart phone function thereto to communicate with an external apparatus; and an operation unit for handling operations of the camera, the microphone, the display module, the sound output module, and the mobile communication module, and the control unit may control the camera, the microphone, the display module, the sound output module and the mobile communication module based on an operation signal of the operation unit.

In an embodiment, the control unit may perform control operations to display the image data on the first arm, to output sound data through the speaker, and to communicate with an external apparatus through a smart phone function provided thereto when the first arm is located on the first position and the second arm is located on any one of the first position, the second position, or the third position.

In an embodiment, the control unit may perform a control operation to display the image data on the first arm and simultaneously to output the sound data through the speaker when the first arm and the second arm are located on the first position overlapping each other.

In an embodiment, the control unit may perform control operations to output sound data through the speaker and to communicate with an external apparatus through a smart phone function provided thereto when the first arm and the second arm are located on the second position or the third position overlapping each other.

In an embodiment, the above head-mounted display may include a risk sensing function and a warning function through the camera and the microphone.

In an embodiment, a GPS module and a gyro sensor may be provided to at least any one of the headphones, the first arm, or the second arm.

In an embodiment, the image display of the first arm may be divided into the left and the right.

Meanwhile, the object of the present invention may be achieved by a head-mounted display including: a pair of headphones having built-in speakers; a first arm rotatably coupled to the pair of headphones and made of a transparent flexible display to display an image; and a second arm made of an opaque material and coupled to the pair of headphones to be relatively rotatable with the first arm to cover and uncover a front surface of the first arm.

Advantageous Effects

According to the present invention, a head-mounted display a function of which is combined with a function of a smart phone, may be transformed to be used in a variety of shapes, enhances portability and convenience of use, and may be safely used.

MODE FOR CARRYING OUT THE INVENTION

Hereinafter, the present invention will be described in detail with reference to the accompanying drawings.

FIGS. 1 through 11 illustrate a head-mounted display according to an embodiment of the present invention. As illustrated in the drawings, a head-mounted display 10 according to an embodiment of the present invention includes a pair of headphones 11a and 11b, a first arm 31, a second arm 41, and a control unit 51.

Figure 7:
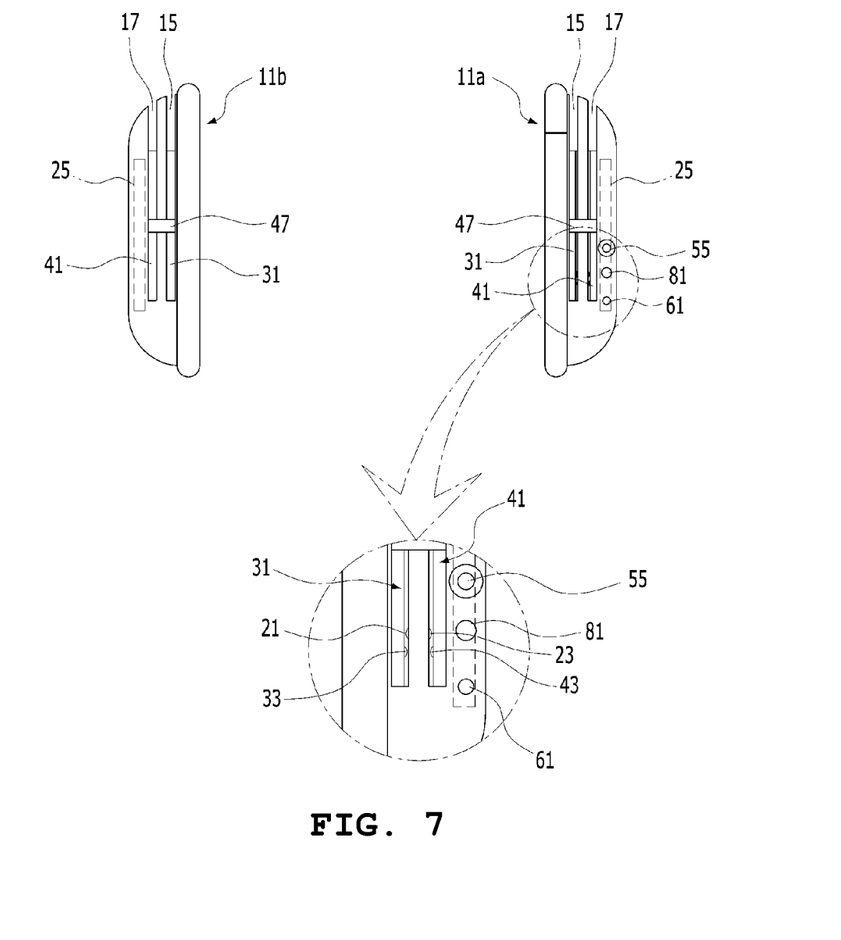
FIG. 7 illustrates enlarged front views of main sections of the headphones in FIG. 1.
Figure 8:
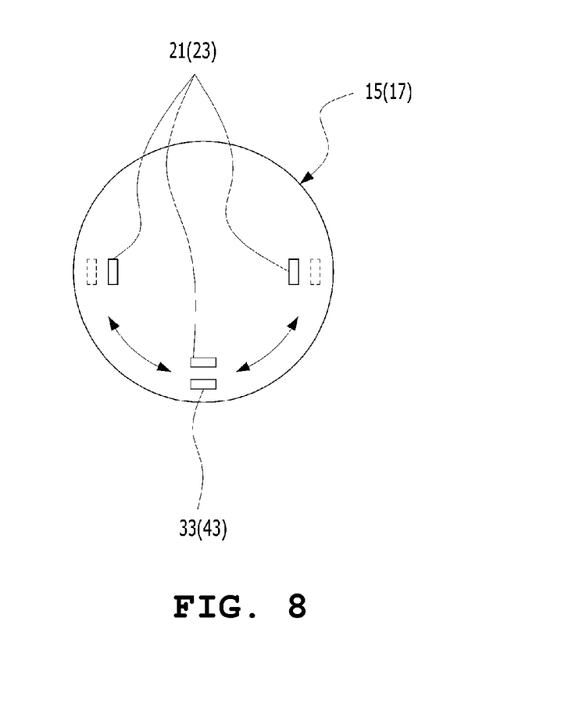
FIG. 8 is a schematic view illustrating an interrelation among each of position detecting sensors and each of sensing protrusions.
Figure 11:
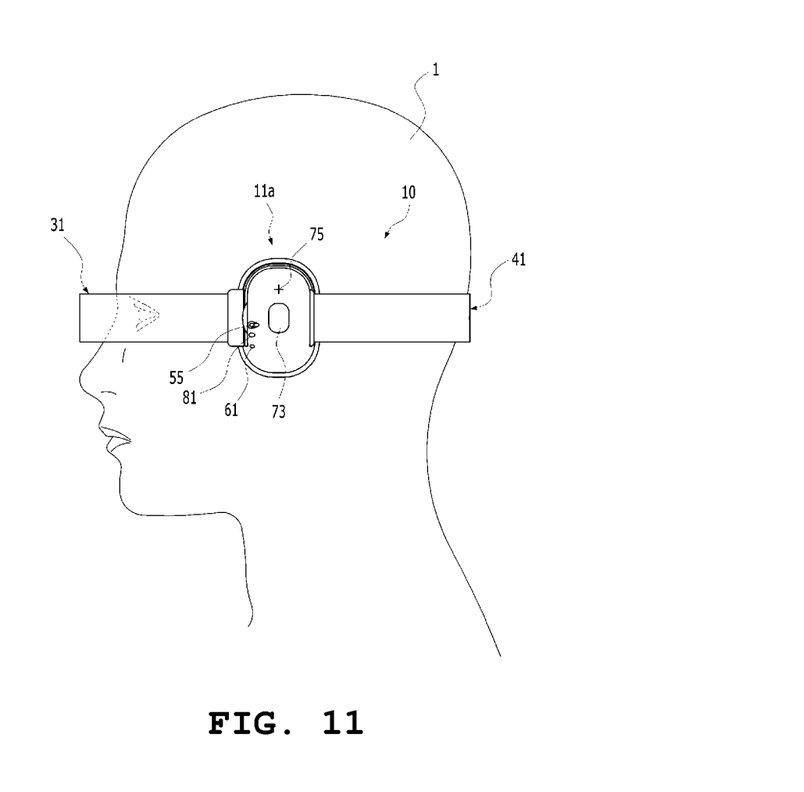
FIG. 11 illustrates a state in which a wearer wears a head-mounted display according to an embodiment of the present invention.

The pair of headphones 11a and 11b include built-in speakers 13 for outputting sound, and are detachably worn by ears of a wearer 1 (see FIG. 11). In each of the headphones 11a and 11b, a first rail groove 15 and a second rail groove are defined apart from each other by a predetermined distance so that the first arm 31 and the second arm 41 may rotate along the rotation tracks respectively. The first rail groove 15 and the second rail groove 17 are partially cut away by a predetermined depth from an edge of each of the headphones 11a and 11b. A plurality of first position detecting sensors 21 and a plurality of second position detecting sensors 23 are respectively provided in the first rail groove 15 and the second rail groove 17 of the headphones 11a to sense respective positions corresponding to a first, a second, and a third position, which will be described later, of the first arm 31 and the second arm 41. The respective position detecting sensors 21 and 23 are disposed along the rotation tracks of the first arm 31 and the second arm 41 corresponding to the first position, the second position, and the third position of the first arm 31 and the second arm 41. The speaker 13 provides a stereo sound output, a warning announcement, middle and low sound outputs, and a vibration function.

The first arm 31 has a band shape having a half-circular arc in cross section, and both ends of the first arm 31 are accommodated in the first rail groove 15. The first arm 31 is rotatably coupled to the headphones 11a and 11b by a general step hinge 47 which reciprocally rotates within a predetermined angular range, for example. To one end of the first arm 31, a first sensing protrusion 33 which moves to the plurality of first position detecting sensors 21 of the first rail groove 15 to trigger operation of the corresponding first position detecting sensor 21 is provided.

Figure 9:
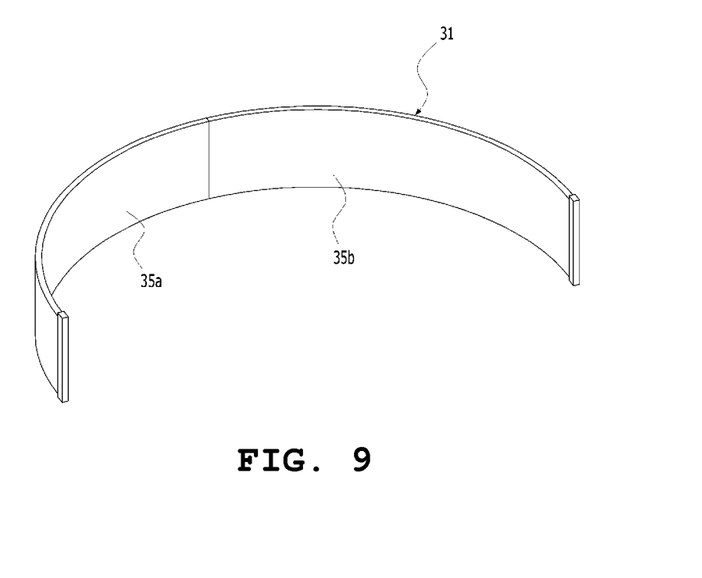
FIG. 9 is a perspective view illustrating another shape of the first arm in FIG. 1.

Also, the first arm 31 is provided with an image display unit 35 receiving an image signal from the control unit 51 and displaying the image on an inner surface of the first arm 31. The image displayed on the image display unit 35 of the first arm 31 may be provided to only one eye or to both eyes of the wearer 1 according to a control of the control unit 51. Although an embodiment of the present invention illustrates that the first arm 31 includes only one image display unit 35, but the present invention is not limited thereto. In another embodiment, the first arm 31 may include a pair of image display unit 35a and 35b divided into the left and the right as illustrated in FIG. 9.

The second arm 41 has a band shape having a half-circular arc in cross section, and both ends of the first arm 31 are accommodated in the second rail groove 17. The second arm 41 is relatively rotatably coupled to the headphones 11a and 11b together with the first arm 31 by the step hinge 47, and covers a front surface of the first arm 31 or is released from the front surface of the first arm 31. To one end of the second arm 41, a second sensing protrusion 43 which moves to the plurality of second position detecting sensors 23 to trigger operation of the corresponding second position detecting sensor 23 is provided.

Meanwhile, each of the first arm 31 and the second arm 41 reciprocally moves among a first position located on a front side of a head of a wearer 1, a second position located on an upper side of the head of the wearer 1, and a third position located on a rear side of the head of the wearer 1.

The first arm 31 is made of a transparent flexible display having the same function as smart glasses, and the second arm 41 may be made of an opaque material.

As illustrated in FIG. 1 and FIGS. 3 through 6, the control unit 51 controls an image output to the first arm 31 and a sound output to the pair of headphones 11a and 11b according to the positions of the first arm 31 and the second arm 41. The control unit 51 is mounted on a circuit board (not shown) and built in the headphones 11a and 11b, and detailed functions of the control unit 51 will be described later.

Figure 10:
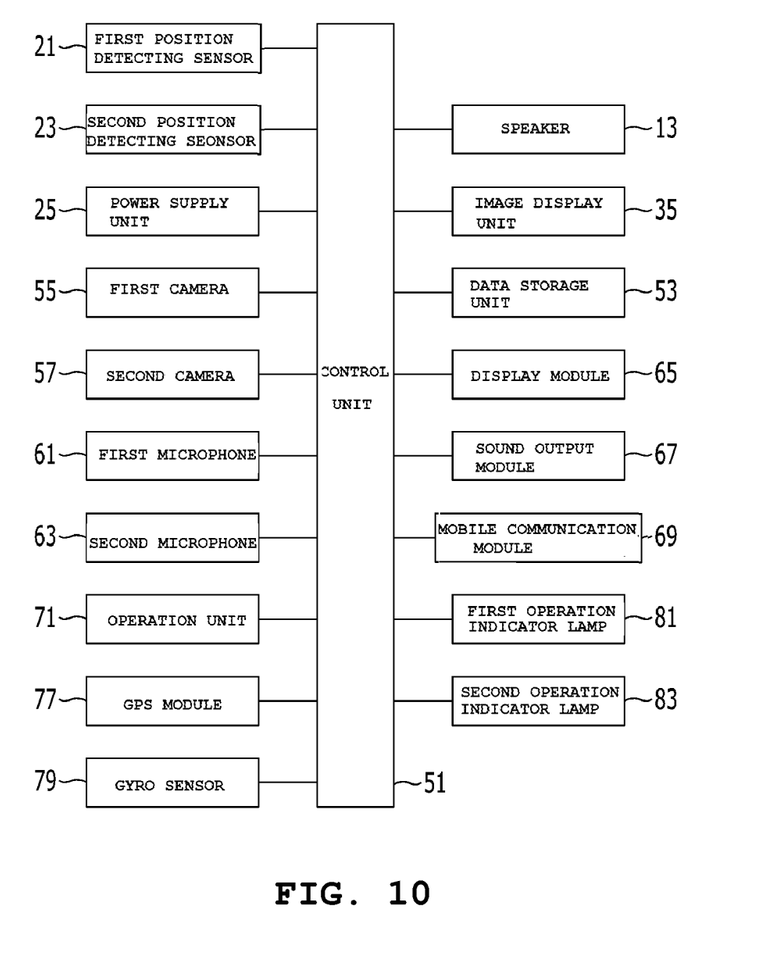
FIG. 10 is a control block diagram of a head-mounted display according to an embodiment of the present invention.

Meanwhile, the head-mounted display 10 according to an embodiment of the present invention includes a data storage unit 53, a camera configured to shoot an image, a microphone configured to receive a sound input, a display module 65, a sound output module 67, a mobile communication module 69, and an operation unit 71.

The data storage unit 53 is provided on the circuit board built in the headphones 11a and 11b, and stores image data, sound data, and information data. The data storage unit 53 is connected to a variety of external apparatuses such as a USB memory device, an external hard disk drive, and the like through USB ports (not shown), which are provided with an on-the-go (OTG) function and provided the headphones 11a and 11b, and may store the image data and the sound data, and the data storage unit 53 may also store the image data shot by each of cameras 55 and 57 and the sound data input by each of microphones 61 and 63.

In an embodiment of the present invention, the first camera 55 and the second camera 57 are provided as cameras, and the number and position of the cameras are not limited thereto.

The first camera 55 is provided to the headphone 11a on one side so that the camera shoots an image of the front side of the wearer 1. The image data shot by the first camera 55 is directly displayed on the image display unit 35 of the first arm 31, or stored in the data storage unit 53. The first camera 55 operates to shoot an image, to take a picture, and to recognize an object on the front side of the wearer 1.

The second camera 55 is provided to a center of the second arm 41 and shoots an image around the second arm 41. The image data shot by the second camera 57 is directly displayed on the image display unit 35 of the first arm 31, or stored in the data storage unit 53. The second camera 55 operates for a mirror-view function for safety and for a warning function through an image analysis. For example, when someone comes running from behind while the wearer 1 walks, or when some car or the like approaches from behind while the wearer 1 rides a bicycle and the like, the second camera 57 analyzes the images of those situations in real time and gives warning. The warning may be provided in the form of an image display, a sound alert, a vibration or the like.

Although this embodiment includes the first microphone 61 and the second microphone 63 as microphones, the number and position of the microphones are not limited thereto.

The first microphone 61 is provided to the headphone 11a of one side so that sound around the headphones 11a and 11b is input. The sound data input through the first microphone 61 is directly output through the speaker 13, or stored in the data storage unit 53.

The second microphone 63 is provided to the second arm 41 and receives sound input around the second arm 41. The sound data input through the second microphone 63 is directly output through the speaker 13 or stored in the data storage unit 53.

The first microphone 61 and the second microphone 63 may perform functions recording external sound and recognizing voice and audio in which, the audio may be specific sound such as clapping sound, car horn from the back of the wearer, or warning sound, and may also perform a function to supplement the ears as receiving big or small sound. For example, the first microphone 61 and the second microphone 63 may convert big sound to small sound or vice versa to protect the ears of the wearer 1, and may be used to provide an automatic translation function and some convenient functions. Meanwhile, the first microphone 61 and the second microphone 63 may be operated to be complementary to each other according to the position.

The display module 65 is provided on the circuit board, and displays image data provided from the data storage unit 53 and image data delivered from each of the cameras 55 and 57 on the image display unit 35 of the first arm 31.

The sound output module 67 is provided on the circuit board, and outputs sound data provided from the data storage unit 53 and sound data received by each of the microphones 61 and 63 through the speaker 13.

The mobile communication module 69 is provided on the circuit board, provides a smart phone function to the head-mounted display according to an embodiment of the present invention, and simultaneously performs communication with an external apparatus so that the head-mounted display 10 is driven through a connection with the Internet and the external apparatus by a wireless communication function, for example. The mobile communication module 69 performs wireless non-contact communication functions such as a mobile communication (e.g., CDMA, GSM, or LTE), a Wi-Fi, a Bluetooth, a Near Field Communication (NFC) and the like.

The operation unit 71 is provided on the headphones 11a and 11b, and handles operations of each of the cameras 55 and 57, each of the microphones 61 and 63, the display module 65, the sound output module 67, and the mobile communication module 69. Although this embodiment illustrates a key button 73 and a touch gesture 75 which performs a specific function when a memorized gesture is input, as the operation units 71, the present invention is not limited thereto.

The control unit 51 controls each of the cameras 55 and 57, each of microphones 61 and 63, the display module 65, the sound output module 67, and the mobile communication module 69 based on signals from the position detecting sensors 21 and 23, and a signal from the operation unit 71 according to an arrangement of the first arm 31 and the second arm 41. The control unit 51 may control each of the cameras 55 and 57, the display module 65, the sound output module 67, and the mobile communication module 69 by recognizing a voice input through the first microphone 61.

Meanwhile, the head-mounted display 10 according to an embodiment of the present invention further includes a GPS module 77 and a gyro sensor 79.

The GPS module 77 is provided in at least any one of the head phones 11a and 11b, the first arm 31, or the second arm 41, and signals the location of the head-mounted display 10.

The gyro sensor 79 is provided to at least any one of the headphones 11a and 11b, the first arm 31, or the second arm 41, and may sense motions of the head-mounted display 10.

Non-described numeral 25 indicates a power supply unit for supplying power to each component of the head-mounted display according to an embodiment of the present invention. A battery is illustrated as the power supply unit 25 in an embodiment and is accommodated in the headphones 11a and 11b so as to be inserted in and withdrawn from the headphones 11a and 11b. Though not illustrated herein, a charging pad, a wireless charging device, or a self power-generation device may also be provided to the headphones 11a and 11b for charging the battery.

Also, non-described numeral 81 indicates a first operation indicator lamp provided to the headphone 11a on one side and indicating the operating status of the head-mounted display according to an embodiment of the present invention, or illuminating the front. Reference numeral 83 indicates a second operation indicator lamp provided to the second arm 41 and indicating the operating status of the second camera 57 and the second microphone 63, or illuminating the surrounding.

Based on the above configuration, power is supplied to the head-mounted display 10 according to an embodiment of the present invention, and operations of the head-mounted display 10 according to an arrangement of the first arm 31 and the second arm 41 will be described below.

Figure 1:
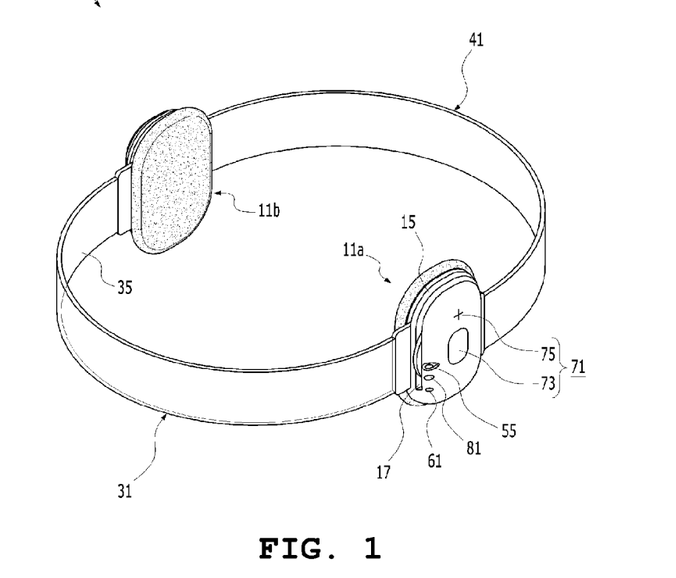
FIG. 1 is a perspective view illustrating a head-mounted display in a first mode according to an embodiment of the present invention.
Figure 2:
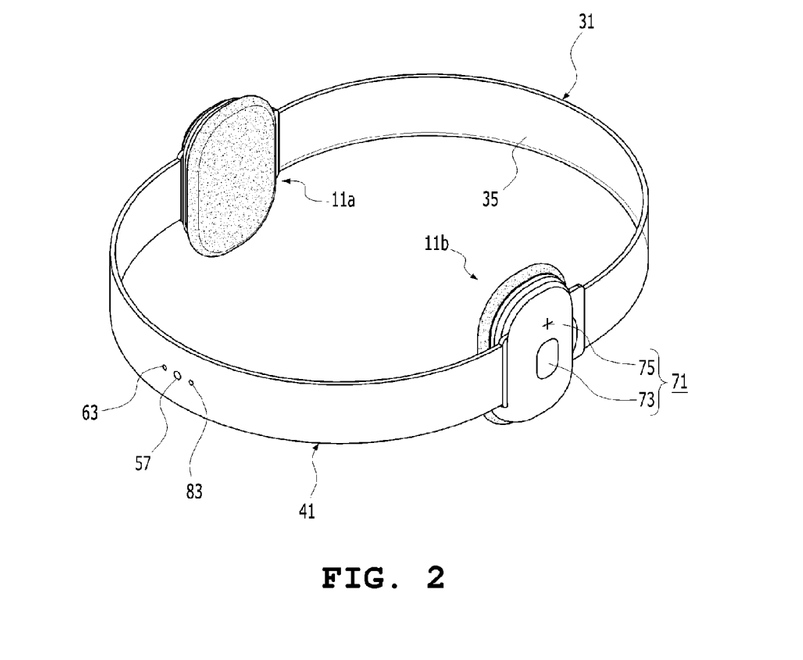
FIG. 2 is a rear perspective view of FIG. 1.

As illustrated in FIGS. 1, 2, and 11, in a first mode in which the first arm 31 is located on the first position and the second arm 41 is located on the third position, the operation of the head-mounted display is described below.

When the first sensing protrusion 33 of the first arm 31 is positioned adjacent to the first location detecting sensor 21 on the first position, the second sensing protrusion 43 of the second arm 41 is positioned adjacent to the second position detecting sensor 23 on the third position, and thus the control unit 51 determines that the head-mounted display is in the first mode based on a signal provided by the first position detecting sensor 21 and the second position detecting sensor 23, the control unit 51 controls the mobile communication module 69 so that the head-mounted display 10 according to an embodiment of the present invention drives a smart phone function which is a basic function. For example, the head-mounted display provides functions such as a voice communication, a web function, driving an application, taking photos and shooting videos, playback of music, a clock, a scheduler, and voice recognition control.

Also, the control unit 51 controls the display module 65 by an operating signal of the operation unit 71 so that an image data shot by each of the cameras 55 and 57 may be displayed on the first arm 31, and simultaneously, the control unit 51 controls the sound output module 67 so that sound data provided from the data storage unit 53 and sound data input through each of the microphones 61 and 63 are output through the speaker 13.

Like the above, when the head-mounted display 10 is in the first mode, the wearer 1 may view the front through the first arm 31 as if the wearer 1 wears glasses so that no limitation is provided to general activities, and computing information, for example, the information controlled by the control unit 51 may be effectively provided through the first arm 31 to the entire field of view. Also, in the first mode, a risk from the rear side may be notified by sound or vibration generated through the second camera 57 or the second microphone 63, or a substantial risk factor may be notified by a warning or a screen delivered by the second camera 57 through the first arm 31 when the screen is displayed.

Figure 3:
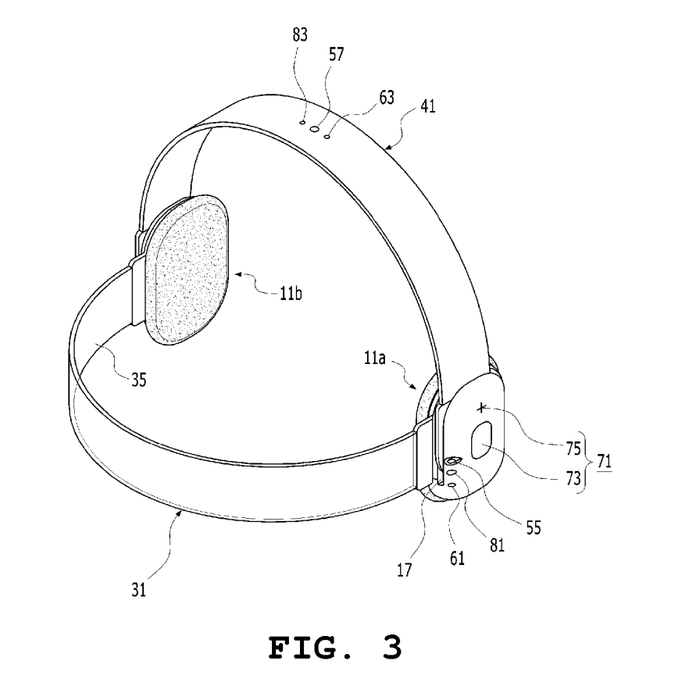
FIG. 3 a perspective view illustrating a head-mounted display in a second mode according to an embodiment of the present invention.

Secondly, as illustrated in FIG. 3, in a second mode in which the first arm 31 is on the first position and the second arm 41 is on the second position, the operation of the head-mounted display 10 is described below.

When the first sensing protrusion 33 of the first arm 31 is positioned adjacent to the first location detecting sensor 21 on the first position, the second sensing protrusion 43 of the second arm 41 is positioned adjacent to the second position detecting sensor 23 on the second position, and thus the control unit 51 determines that the head-mounted display is in the second mode based on a signal provided by the first position detecting sensor 21 and the second position detecting sensor 23, the control unit 51 controls the mobile communication module 69 so that the head-mounted display 10 according to an embodiment of the present invention drives a smart phone function which is a basic function in a same manner as the first mode.

Meanwhile, in the second mode, the control unit 51 controls the display module 65 by an operating signal of the operation unit 71 so that image data shot by the first cameras 55 may be displayed on the first arm 31, and simultaneously the control unit 51 controls the sound output module 67 so that sound data provided from the data storage unit 53 and sound data input through the first microphone 61 are output through the speaker 13.

Like the above, when the head-mounted display 10 is in the second mode, the wearer 1 may view the front through the first arm 31 as if the wearer 1 wears glasses so that no limitation is provided in general activities, and the information controlled by the control unit 51 may be effectively provided through the first arm 31 to the entire field of view. However, the functions of the second camera 57 and the second microphone 63 are not used at that time.

Figure 4:
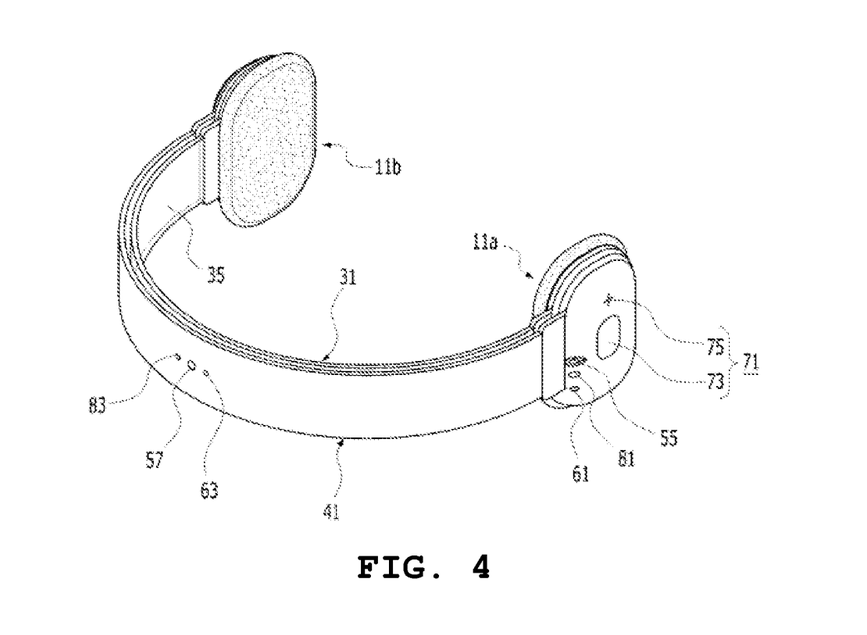
FIG. 4 is a perspective view illustrating a head-mounted display in a third mode according to an embodiment of the present invention.

Next, as illustrated in FIG. 4, in a third mode in which the first arm 31 and the second arm 41 are located on the first position overlapping each other, the operation of the head-mounted display 10 is described below.

When the first sensing protrusion 33 of the first arm 31 is positioned adjacent to the first location detecting sensor 21 on the first position, the second sensing protrusion 43 of the second arm 41 is positioned adjacent to the second position detecting sensor 23 on the first position, and thus the control unit 51 determines that the head-mounted display is in a third mode based on a signal provided by the second position detecting sensor 23, the control unit 51 controls the display module 65 so that image data provided from the data storage unit 53 and an image shot by each of the cameras 55 and 57 are displayed on the first arm 31, and simultaneously the control unit 51 controls the sound output module 67 so that sound data provided from the data storage unit 53 and sound data input through each of the microphones 61 and 63 are output through the speaker 13.

Thus, when the head-mounted display 10 is in the third mode, the second arm 41 covers the front surface of the first arm 31, and therefore the wearer 1 is unable to view the front through the first arm 31 unlike the circumstance as the wearer 1 wears glasses. When the first arm 31 is made of a transparent flexible display and the second arm 41 is made of an opaque material, the second arm 41 covers the first arm 31, and therefore the image displayed on the display unit 35 of the first arm 31 may be viewed more clearly.

Accordingly, the head-mounted display 10 operates mainly for an image display through the first arm 31 and a sound output through the speaker 13, and gives maximum appreciation of movies and games by providing the image in a stereoscopic image (3D display). Also the front side of the wearer 1 is shot by the first camera 55 and the second camera 57, sound is input through the microphone 61 and the microphone 63, and the image and the sound provided by each of the cameras 55 and 57, and each of the microphones 61 and 63 are outputted through the first arm 31 and the speaker 13 as a real-time image in a stereoscopic state with an augmented reality (AR) function included therein. For example, a virtualized environment may possibly be provided, and the wearer 1 may use a real vehicle and the like through a wireless controller (such as a Bluetooth joystick) while lying on the back.

Figure 5:
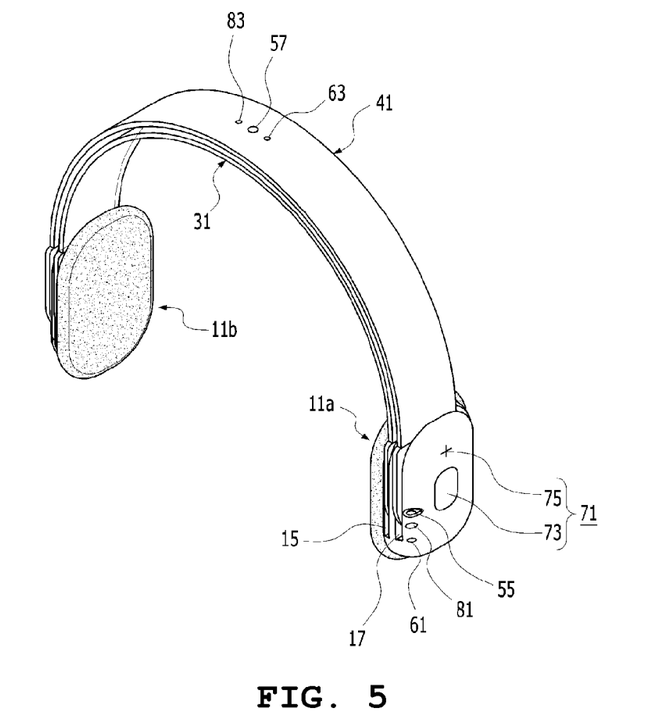
FIG. 5 is a perspective view illustrating a head-mounted display in a fourth mode according to an embodiment of the present invention.

Also, as illustrated in FIG. 5, in a fourth mode in which the first arm 31 and the second arm are located on the second position overlapping each other, the operation of the head-mounted display 10 is described below.

When the first sensing protrusion 33 of the first arm 31 is positioned adjacent to the first location detecting sensor 21 on the first position, the second sensing protrusion 43 of the second arm 41 is positioned adjacent to the second position detecting sensor 23 on the second position, and thus the control unit 51 determines that the head-mounted display is in a fourth mode based on a signal provided by the second position detecting sensor 23, the control unit 51 controls the mobile communication module 69, as in the first mode, so that the head-mounted display 10 according to an embodiment of the present invention performs a smart phone function which is a basic function.

Meanwhile, in the fourth mode, the control unit 51 controls the sound output module 67 based on the operation signal from the operation unit 71 so that the sound data provided from the storage unit 53 is output through the speaker.

As above, when the head-mounted display 10 is in the fourth mode, the first arm 31 and the second arm 41 are located on the upper side of the head of the wearer 1 so that the image may not be viewed, and thus the head-mounted display 10 is operated centering on a music listening function. Also, the front view of the wearer 1 is not obstructed, so that the wearer 1 may receive services such as a phone call, an e-mail, and a message through the speaker 13.

Figure 6:
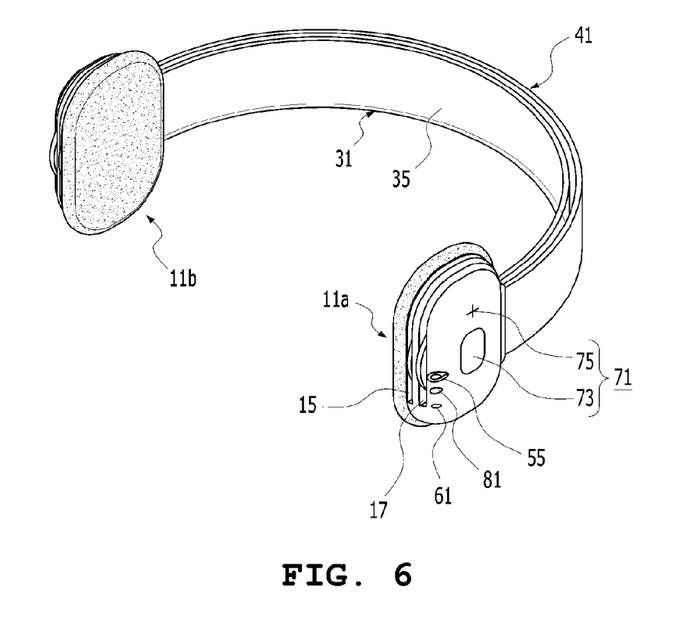
FIG. 6 is a perspective view illustrating a head-mounted display in a fifth mode according to an embodiment of the present invention.

Also, as illustrated in FIG. 6, in the fifth mode in which the first arm 31 and the second arm 41 are on the third position overlapping each other, the operation of the head-mounted display is described below.

When the first sensing protrusion 33 of the first arm 31 is positioned adjacent to the first location detecting sensor 21 on the third position, the second sensing protrusion 43 of the second arm 41 is positioned adjacent to the second position detecting sensor 23 on the third position, and thus the control unit 51 determines that the head-mounted display is in a fifth mode based on a signal provided by the first location detecting sensor 21 and the second position detecting sensor 23, the control unit 51 controls the mobile communication module 69, as in the first mode, so that the head-mounted display 10 according to an embodiment of the present invention performs a smart phone function which is a basic function.

Meanwhile, in the fifth mode, the control unit 51 controls the sound output module 67 based on the operation signal of the operation unit 71 so that sound data provided from the storage unit 53 and sound data received through the second microphone 63 are output through the speaker 13.

As above, when the head-mounted display 10 is in the fifth mode, the first arm 31 and the second arm 41 are located on the rear side of the head of the wearer 1, an image may not be viewed, and the head-mounted display is operated centering on a music listening function. Also, the front view of the wearer 1 is not obstructed, so that the wearer 1 may receive services such as a phone call, an e-mail, and a message through the speaker 13. Also, when a risk is sensed through the second camera 57 and the second microphone 63, a warning is conveyed to the wearer 1 in the form of sound or vibration.

Thus, according to the present invention, a first arm displaying an image and a second arm covering/uncovering the front surface of the first arm are rotatably coupled to a pair of headphones so that each of the first arm and the second arm may relatively rotate, the image output through the first arm and the sound output through the pair of headphones are controlled according to the positions of the first and the second arms, and the head-mounted display function as well as the smart glass function is further provided so that the head-mounted display may be transformed to be used in various shapes, enhance portability and convenience of use, and may be safely used.

Meanwhile, though not illustrated in the embodiments described above, a gas detecting sensor, an illumination sensor, a compass and the like may be further provided to a head-mounted display according to an embodiment of the present invention to implement a variety of additional functions.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A head-mounted display comprising:
a pair of headphones having a built-in speaker for outputting sound;
a first arm rotatably coupled to the pair of headphones and displaying an image, the first arm having a band shape having a half-circular arc in cross section;
a second arm coupled to the pair of headphones to be relatively rotatable with the first arm to cover and release a front surface of the first arm, the second arm having a band shape having a half-circular arc in cross section;
a plurality of position detecting sensors sensing positions of the first arm and the second arm; and
a control unit controlling the image output to the first arm and the sound output to the headphones according to the sensing positions of the first arm and the second arm,
wherein the first arm is made of a transparent flexible display and the second arm is made of an opaque material such that an image displayed on the display of the first arm is viewed clearly when the second arm covers the first arm and
wherein the display of the first arm is divided into a left part and a right part.

2. The head-mounted display of claim 1, wherein each of the first arm and the second arm reciprocally moves among a first position located on a front side of the head of a wearer, a second position located on an upper side of the head of the wearer, and a third position located on a rear side of the head of the wearer.

3. The head-mounted display of claim 2, further comprising:
a data storage unit which stores an image data, a sound data, and an information data therein;
a camera shooting an image;
a microphone through which sound is input;
a display module for displaying an image on the first arm;
a sound output module for outputting sound through the speaker;
a mobile communication module for providing a smart phone function and enabling communication with an external apparatus; and
an operation unit for handling operations of the camera, the microphone, the display module, the sound output module, and the mobile communication module,
wherein the control unit controls the camera, the microphone, the display module, the sound output module, and the mobile communication module according to an operation signal of the operation unit.

4. The head-mounted display of claim 3, comprising a risk sensing function and a warning function through the camera and the microphone.

5. The head-mounted display of claim 2, wherein the control unit performs control operations to display the image data on the first arm, to output sound data through the speaker, and to communicate with an external apparatus through a smart phone function provided thereto when the first arm is located on the first position and the second arm is located on anyone of the first, the second, and the third position.

6. The head-mounted display of claim 2, wherein the control unit performs control operations to display the image data on the first arm and simultaneously to output sound data through the speaker when the first arm and the second arm are located on the first position overlapping each other.

7. The head-mounted display of claim 2, wherein the control unit performs control operations to output sound data through the speaker and to communicate with an external apparatus through a smart phone function provided thereto when the first arm and the second arm are located on the second position or the third position overlapping each other.

8. The head-mounted display of claim 1, wherein the headphones comprise a first rail groove and a second rail groove spaced apart by a predetermined interval from each other such that the first arm and the second arm are able to rotate along rotation tracks of the first and second rail grooves, and the plurality of position detecting sensors are provided on the first rail groove and the second rail groove.

9. The head-mounted display of claim 1, wherein a GPS module and a gyro sensor are provided to at least anyone of the headphones, the first arm, and the second arm.

10. The head-mounted display of claim 1, wherein the first arm and the second arm rotate independently around the pair of headphones without rotation of the pair of headphones, such that each of the first arm and the second arm can be located on one of a first position located on a front side of the head of a wearer, a second position located on an upper side of the head of the wearer, and a third position located on a rear side of the head of the wearer.

\* \* \* \* \*